United States Patent [19]

Krofta

[11] Patent Number: 5,306,422
[45] Date of Patent: Apr. 26, 1994

[54] COMPACT CLARIFIER SYSTEM FOR MUNICIPAL WASTE WATER TREATMENT

[75] Inventor: Milos Krofta, Lenox, Mass.

[73] Assignee: Lenox Institute of Water Technology, Inc., Lenox, Mass.

[21] Appl. No.: 33,015

[22] Filed: Mar. 18, 1993

Related U.S. Application Data

[63] Continuation-in-part of Ser. No. 885,522, May 19, 1992, which is a continuation-in-part of Ser. No. 756,323, Sep. 6, 1991, Pat. No. 5,160,611, which is a continuation of Ser. No. 241,384, Sep. 7, 1988, Pat. No. 4,931,175.

[51] Int. Cl.$^5$ .............................. C02F 1/24; C02F 3/08
[52] U.S. Cl. ................. 210/151; 210/195.1; 210/202; 210/221.2; 210/262
[58] Field of Search .............. 210/150, 151, 195.1, 210/195.3, 202, 207, 221.1, 221.2, 258, 259, 261, 262, 615, 622, 626, 253

[56] References Cited

U.S. PATENT DOCUMENTS

| | | | |
|---|---|---|---|
| 2,553,228 | 5/1951 | Yonner | 210/261 |
| 3,617,541 | 11/1971 | Pan | 210/150 |
| 4,022,696 | 5/1977 | Krofta | 210/520 |
| 4,184,967 | 1/1980 | Krofta | 210/525 |
| 4,377,485 | 3/1983 | Krofta | 210/704 |
| 4,399,028 | 8/1983 | Kile et al. | 210/221.2 |
| 4,411,780 | 10/1983 | Suzuki et al. | 210/150 |
| 4,452,699 | 6/1984 | Suzuki et al. | 210/622 |
| 4,618,430 | 10/1986 | Karret, Jr. | 210/221.1 |
| 4,626,345 | 12/1986 | Krofta | 210/104 |
| 4,758,453 | 7/1988 | Challet et al. | 210/150 |
| 4,880,533 | 11/1989 | Hondulas | 210/221.2 |
| 5,013,429 | 5/1991 | Krofta | 210/137 |
| 5,064,531 | 11/1991 | Wang et al. | 210/221.2 |
| 5,145,582 | 9/1992 | Krofta | 210/609 |

FOREIGN PATENT DOCUMENTS

55-15279 4/1980 Japan.

OTHER PUBLICATIONS

Morper, M. et al., "Improvement of Existing Wastewater Treatment Plants' Efficiencies Without Enlargement of Tankage By Application of the Linpor-Process—Case Studies", Water Science Technology, vol. 22, No. 7/8, pp. 207–215, 1990.

*Primary Examiner*—Christopher Upton
*Attorney, Agent, or Firm*—Dike, Bronstein, Roberts & Cushman

[57] ABSTRACT

A compact water treatment plant has at least one vertical stack of dissolved air flotation (DAF) type clarifiers. Raw water is directed first to a single stage clarifier with a shallow tank. Its output is fed to an underlying two stage clarifier, preferably one with tall, mutually isolated cells, inclined baffles over a filtration medium in each cell, a cell-by-cell backwash capability, and an arrangement for isolating the first filtrate from the clarified water. Preferably, there are two such stacks in side-by-side array to provide a peak-load capacity, redundancy, and extreme compactness. Also preferably, clarified water from the single stage clarifier flows to the two stage clarifier via a bioreactor and an associated DAF clarifier. A source of aeration defines an upper, aerobic zone in the reactor where bacteria act on organic contaminants (COD's and BOD's). Strips of a deep pile, woven textile form a biocarrier. The strips oscillate in the tank. A portion of the bioliquor and sludge from the bioreactor-dedicated clarifier recirculate through a lower, anoxic zone of the bioreactor for denitrification.

15 Claims, 6 Drawing Sheets

COMPACT CLARIFIER SYSTEM FOR MUNICIPAL WASTE WATER TREATMENT

REFERENCE TO RELATED APPLICATIONS

This application is a continuation-in-part of U.S. application Ser. No. 07/885,522 filed May 19, 1992, which in turn is a continuation-in-part of U.S. Ser. No. 07/756,323 filed Sep. 6, 1991, now U.S. Pat. No. 5,160,611, which is a continuation of U.S. Ser. No. 241,384 filed Sep. 7, 1988, now U.S. Pat. No. 4,931,175.

BACKGROUND OF THE INVENTION

This invention relates in general to dissolved air flotation ("DAF") clarification of water. More specifically, it relates to a highly compact, variable capacity apparatus for treating municipal waste water to remove standard pollutants to within environmentally safe levels.

Water clarification is the removal of particulate contaminants suspended in water. Water clarification to remove total suspended solids ("TSS") is essential in any municipal water treatment system, as well as in sewage treatment. The water can be clarified by sedimentation or flotation of the particles.

Sedimentation facilities are in wide use, but their efficiency is relatively low. Their theoretical peak capacity is 0.5 gallons per minute per square foot. To handle large volumes of raw input water, treatment facilities using sedimentation tanks must be large and deep. There are obvious disadvantages in construction cost and land use. To increase capacity, a large area is covered with multiple, large concrete tanks arrayed side-by-side across a site. The weight of the tanks and the water they hold requires that they be set into the ground. Odors are usually open to atmosphere, increasing difficulty in siting a treatment plant.

Flotation techniques dissolve a few percent of air by volume in pressurized water, and then release the air in the form of microscopic bubbles that attach to the suspended particles. The bubbles carry the particles upwardly where they form a floating sludge. The particles are usually coagulated and flocculated by alum and polymers before the air bubbles are introduced. Flotation techniques are theoretically capable of clarification rates of 7.5 gallons per minute per square foot of flotation area, fifteen times the maximum theoretical rate for sedimentation techniques. U.S. Pat. Nos. 4,022,696; 4,377,485; 4,625,345; 4,184,967 and 4,931,175 to Milos Krofta describe earlier DAF type clarifiers operating in this general manner.

In the '696 clarifier, sold under the trade designations "SPC" and "Supracell", the flotation occurs in a circular tank. The raw water is fed into the tank via a central pipe to multiple outlets immersed in the tank which rotate about the tank. The inlet flow is oriented opposite to the direction of rotation of the inlet pipe and is at a velocity with respect to the rotation rate such that the raw water has a net zero velocity as it enters the tank. The raw water inlet flow assembly and a scoop for removing the floated sludge are mounted on a carriage that rotates about the tank. The scoop is preferably of the type described in applicant's U.S. Pat. No. 4,184,967. The rate of rotation is set so that the floated particles will reach the surface of the water held in the tank in the time of one rotation. A good degree of clarification can be achieved with each rotation of the carriage.

U.S. Pat. No. 4,377,485 discloses a later clarifier of the present application sold under the trade designations "SAF" and "Sandfloat", which utilizes the basic approach of the '696 invention, also operating with the net zero velocity principle, but also adding a second filtration stage with a set of wedge-shaped sand beds covering the bottom of the flotation tank. The water clarified by the flotation process flows through the underlying sand beds into a clarified water collecting chamber. A suction apparatus mounted on the carriage periodically backwashes each section of the filter in combination with a flow of backwash water introduced through the collection chamber. During clarification, when the flocs are formed, pressurized, aerated water is introduced to the open, lower end of the flocculation chamber via a manifold with multiple outlets. The bubbles carry the flocced particulates upwardly to form a floated sludge layer. The clarification rate is comparable to that of the '696 "Supracell" clarifier.

U.S. Pat. No. 4,626,345 discloses a clarifier, sold under the trade designations "SASF" and "Sandfloat-Sedifloat". It does not utilize the net zero velocity principle, but does employ a sand bed for two stage clarification. In this apparatus, the raw water enters a central cylindrical compartment, which acts as a hydraulic flocculator, and then flows over a dividing wall into a surrounding circular flotation tank. Aerated water is added via a fixed manifold. Rotating elements include a scoop remover for the floated sludge and a suction hopper that cleans the filter beds. The scoop is the same general type as used with the Supracell and Sandfloat units described above. This '345 SASF apparatus offers two stage clarification with a more compact unit and at a lower cost than the SAF clarifier.

While water clarification in the past has focussed primarily on the removal of suspended solids, in municipal waste water treatment it is also necessary to remove dissolved and colloidal organic particles as well as certain inorganic chemicals, particularly nitrogen and phosphorous-bearing compounds such as nitrites, nitrates and phosphates associated with organic waste, fertilizers and detergents. The organic particulates, if not treated, become septic and produce strong odors. They are controlled by biological oxidation. Their presence is usually expressed in terms of a biological oxygen demand ("BOD"). Other suspended contaminants are neutralized using chemical oxidation. Their presence is usually expressed in terms of a chemical oxygen demand ("COD"). Excess nitrates and phosphates are also a problem, among other reasons, because they stimulate the growth of algae in bodies of water that ultimately receive the treated effluent. Current U.S. Government standards require there be less than 30 mg/l of BOD's in the treated effluent, less than 30 mg/l of total suspended solids (TSS), and that the total of the TSS and BOD concentrations in the treated effluent be less than 15% of their initial concentration in the raw waste water.

Heretofore a variety of arrangements have been used to reduce the levels of these pollutants. One has been to add reactors in line with sedimentation tanks to reduce the BOD'S. The reactor can be as simple as a tank where air is added for bacteria to react with the organics. Suitable aerobic bacteria are fixed on a carrier immersed in aerated waste water. Known carriers include foams, plastics and sand. The LINPOR system is one example of this approach. It uses small cubes of a plastic foam material as the carrier. The cubes are added to an aeration tank where they tend to float. A large quantity (20% to 30% of the tank volume) must be used in order to get a good immersion and therefore a reliable interaction with the waste water. This approach increases the efficiency of the treatment system with no physical increase in its size, but it is very expensive. More generally, treatment with bioreactors is slow, costly, and requires additional treatments to control TSS and nitrogen and phosphorous-bearing compounds.

DAF clarifiers alone are excellent at removing TSS in a cost effective manner, but heretofore they have not been able to meet the aforementioned Government standards for BOD and combined BOD and TSS. For example, Supracell clarifiers are very efficient for removing TSS at a low cost, but Supracell units in general remove 40% to 60% of the BOD in the raw input water with the use of flocculation chemicals.

Known two stage clarifiers could also be used, but they also do not increase the clarification efficiency to a level that meets the Government standards. Moreover, any increased filtration due to a chemically enhanced removal of BOD's would add an extra load to the filter medium which would plug it, and in turn, would require increased backwashing. Further, two stage units are, in general, smaller, slower, and more costly to install and operate than single stage units such as the Supracell clarifier.

With a few notable exceptions, in conventional municipal waste water treatment to date DAF clarifiers have had a limited role, chiefly to remove TSS as part of treatment for peak flows such as storm sewer overflows during and immediately after a rainstorm.

It is therefore a principal object of this invention to provide a highly compact DAF clarifier system that is effective in lowering TSS and BOD.

A further object is to provide this advantage at a substantial cost savings, capital and operational, as compared to conventional sedimentation treatment facilities of comparable treatment efficiency and capacity.

Another object is to provide a biological treatment apparatus and method that can be used in conjunction with clarification to meet all U.S. Government clean waste water standards.

Still another object is to provide these advantages while also providing a capacity to handle peak flows as during rain storms or seasonal population increases.

Yet another object is to provide the foregoing advantages while also controlling odor and noise pollution.

A still further object is to provide these advantages while also producing a comparatively dry sludge output that can be readily handled among and/or further processed to control biological and heavy metal contaminants.

SUMMARY OF THE INVENTION

Municipal waste water is treated in at least one vertical stack of DAF type clarifiers, and preferably a side-by-side pair of such stacked clarifiers. The raw water is first directed to the upper clarifier which is a single stage clarifier, preferably of the Supracell type, which removes a large percentage of total suspended solids and a substantial portion of BOD's and other environmentally objectionable contaminants. The clarification tank is shallow so that the clarifier, even when fully loaded with water, can be supported in an elevated position over a two stage clarifier having a second filtration stage provided by a layer of sand or like media disposed at the bottom of a comparatively tall flotation tank. The lower tank is annular and preferably characterized by radial walls that divide the tank into mutually isolated cells. A central hydraulic flocculator feeds the output water of the single stage clarifier to the cells. Each cell preferably includes inclined baffles to enhance the rise path and to retain the filter media during backwashing. The two stage clarifier also preferably has dual rings located around the tank and acting as manifolds to all of the cells for clarified water collection, first filtrate collection, and backwash feed. Valving isolates the first filtrate from the clarified water. Phosphorous compounds are removed principally in the filtration stage of this clarifier.

To achieve desired water treatment standards consistently and reliably, a bioreactor is preferably connected in the flow path between the clarifiers. The bioreactor has a tall, cylindrical reaction tank with an upper aerobic zone and a lower anoxic zone. Biomasses of suitable known bacteria are located in each zone to digest pollutants. An aerator located in the reaction tank above the anoxic zone introduces air into the bioliquor mix of water, bacteria, and other dissolved and suspended particulates in the tank via a set of porous pipes. The free air and a biomass of aerobic bacteria digest organics in the upper aerobic zone.

The aerobic and anaerobic bacteria are held on a biocarrier. In the presently preferred form, the biocarrier is strips of woven textiles such as used, deep-pile carpeting. An oscillating frame of tubular rods and circumferentially curved stainless steel plates with hooks hold the strips of carpet. The treated bioliquor has a mixture of suspended solids with a fairly high concentration, e.g. 2,000 to 3,000 ppm. it circulates upwardly into a dedicated DAF clarifier that removes sloughed off biomass and other suspended solids in the liquid as floated sludge. This clarifier reduces the TSS to a level that allows the two-stage clarifier to operate efficiently on the biotreated and clarified water. The dedicated clarifier is preferably a small single stage clarifier mounted on a platform over the bioreactor tank.

The bioreactor has two recirculation circuits. One directs a first portion of the clarified and biotreated outlet water from the dedicated clarifier back to the bioreactor inlet. This flow can typically vary from 40% to 100% of the total outflow. A second portion of the clarified and biotreated outlet water flows to the two stage, lower clarifier in the stack or stacks. The second portion has a flow rate equal to the inlet flow to the bottom of the bioreactor from the single stage, upper clarifier in the stack.

A second recycling circuit directs at least a portion of the floated sludge from the dedicated clarifier and a portion of the bioliquor in the reactor tank from the top of the aerobic zone to the main inlet at the bottom of the reactor tank. This flow is typically two to five times the inflow to the reactor from the single stage clarifier. In reacting with organic contaminants the anerobic bacteria in the anoxic zone produce denitrification.

These and other features and objects of the invention will be more readily understood from the following detailed description of the preferred embodiments which should be read in light of the accompanying drawings.

DETAILED DESCRIPTION OF THE PREFERRED EMBODIMENTS

Figure 1:
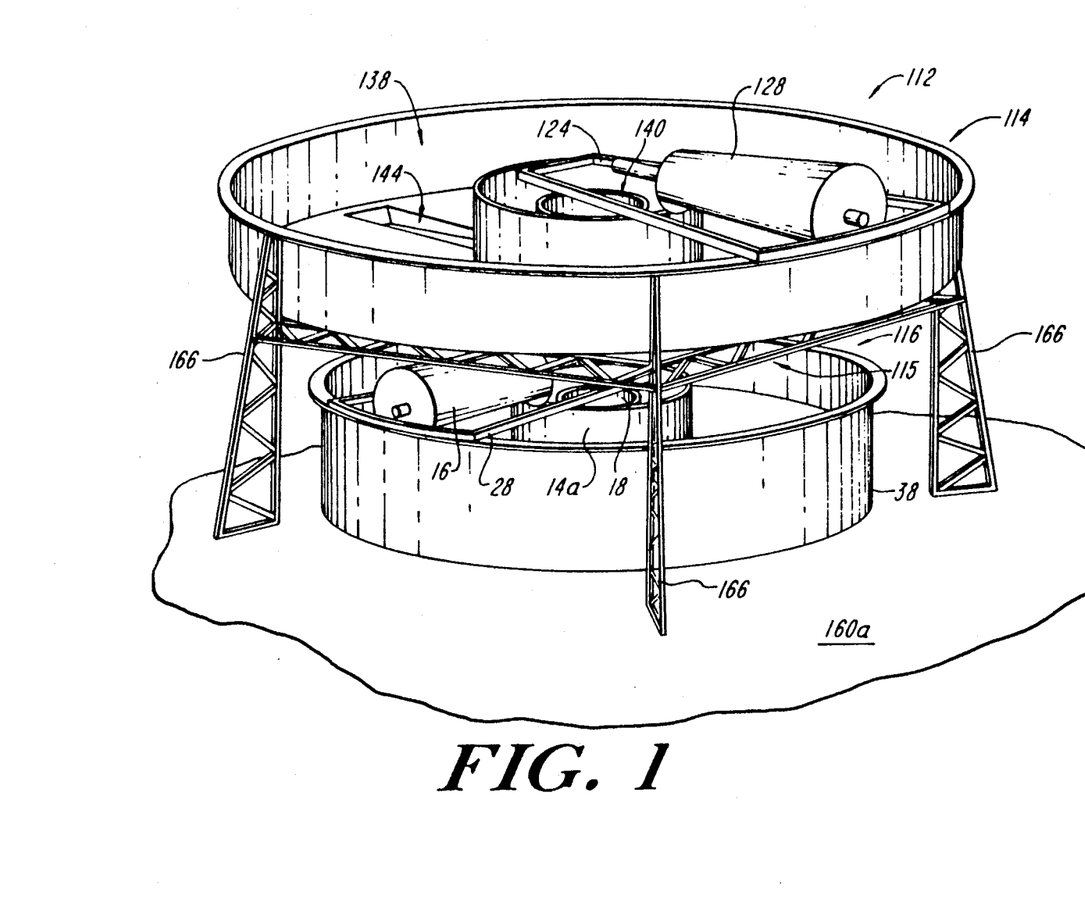
FIG. 1 is a highly simplified view in perspective of one clarifier stack of a municipal waste water treatment plant according to the present invention.
Figure 2:
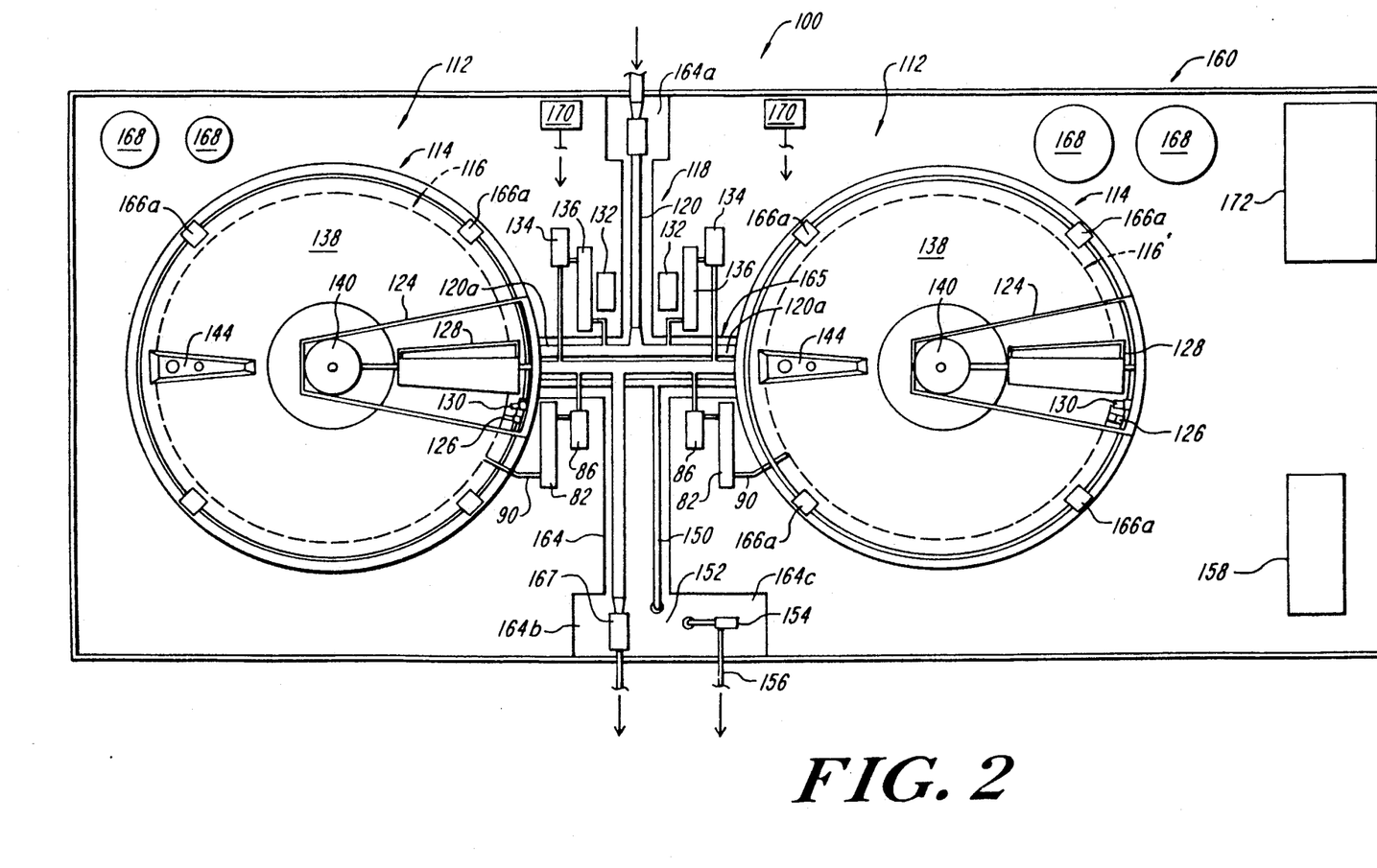
FIG. 2 is a top plan view of a complete plant using two of the stacks shown in FIG. 1, but with concrete supports instead of steel supports.
Figure 3:
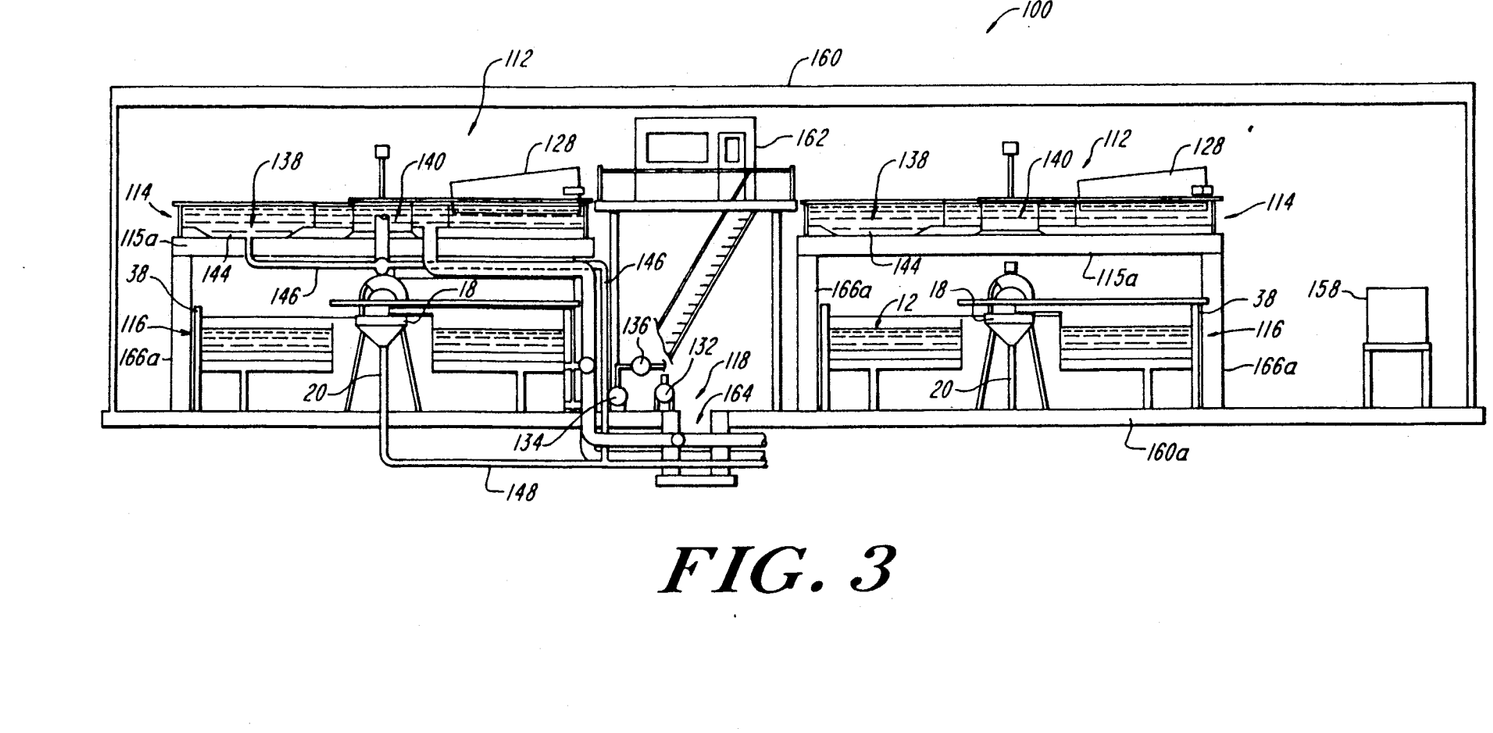
FIG. 3 is a view in front elevation of the plant shown in FIG. 2.

FIGS. 1-3 show a system 100 for treating municipal waste water highly efficiently and with an inherent capacity to accept increases in flow such as those associated with rain storms or seasonal population increases as occur for example at resort towns during a tourist season. The system includes two stacks or trains 112,112 each having clarifiers 114 and 116, The stacks 112 are in a side-by-side array with common, centrally located piping 118 for the water and sludge flows into and out of the facility. The upper clarifier 114 is a single stage clarifier that removes suspended solids from the raw inlet water supplied from a main feed pipe 120. In the preferred form it is a clarifier of the type sold by Krofta Engineering Corp. under the trade designation SPC or Supracell and described in U.S. Pat. No. 4,022,696. The lower clarifier 116 is a two stage clarifier, preferably a type SAF-BP clarifier also sold by the Krofta Engineering Corp. Its pertinent disclosure appears below with reference to FIGS. 6 and 7.

The raw water from pipe 120 is directed by branches 120a,120a to raw water distributors supported on carriages 124,124 that each rotate about one of the clarifiers 114 powered by a motor 126. The carriages 124 also support a multi-bladed scoop 128 of the type described in U.S. Pat. No. 4,184,967 powered by motor 130, also mounted on the carriage. The raw water is treated with a flocculating agent stored at 168 and fed by a conventional chemical feed system 170 into a dissolved air pressurized water feed line. An air compressor 132 provides the pressurized air for each clarifier 114. A pump 134 pressurizes recycled clarified water. An air dissolving tube 136 dissolves the compressed air into the pressurized water. This dissolved air is released in a flotation tank 138 of the clarifier 114 in a manner such that the dissolved air forms microscopic air bubbles in the water. The release of the treated raw water is in a direction opposite to that of the motion of the carriage 124 so that the net velocity of the water introduced into the flotation tank is substantially zero.

In one rotation of the carriage microscopic air bubbles produced by the release of the dissolved air float suspended particulates that have been chemically flocculated. The flotation carries the flocs upwardly to the surface of the water held in the tank 138. The floated flocs form a sludge that is removed by the scoop 128 and conducted to a central sludge collection chamber 140. Some particulates, such as sand, settle. The carriage also carries a bottom scraper that advances settled particulates along the bottom wall of the tank 138 to a sump 144. Settled sludge is discharged via pipe 146 that connects to a sludge discharge line 148 from the clarifier 116. Conduit 150 directs all of the collected sludge, floated and settled, from both clarifiers 114 and 116 to a pit 152. Pump 154 and line 156 discharge the sludge from the pit for removal or further processing, such as the removal of excess water with a belt filter press 158 and/or treatment with oxygen and/or ozone in a sludge stabilizer of the type described in applicant's U.S. Pat. No. 5,013,429. The sludge stabilizer can produce a stabilized sludge that is sufficiently free of biological and heavy metal contaminants that it can be used as a fertilizer or mulch. With further processing as described in U.S. Pat. Nos. 5,013,429 and 5,145,582 it is also comparatively dry (20% to 40% dry solid content), thus reducing its weight and facilitating its shipment to a disposal or processing site.

The clarifier 114 is very effective in removing total suspended solids. Concentrations of 300 ppm are reliably reduced to values such as 20-50 ppm. It is also significant that this exceptional degree of clarification can be achieved in a shallow (16-18 inches) flotation tank and at high throughput rates, e.g. about 14 m$^3$/min for a Supracell clarifier with a tank diameter of 40 feet. The clarifier 114 also removes BOD, but not as efficiently as it removes TSS. Typically it lowers the concentration of BOD's by about 50%.

Figure 6:
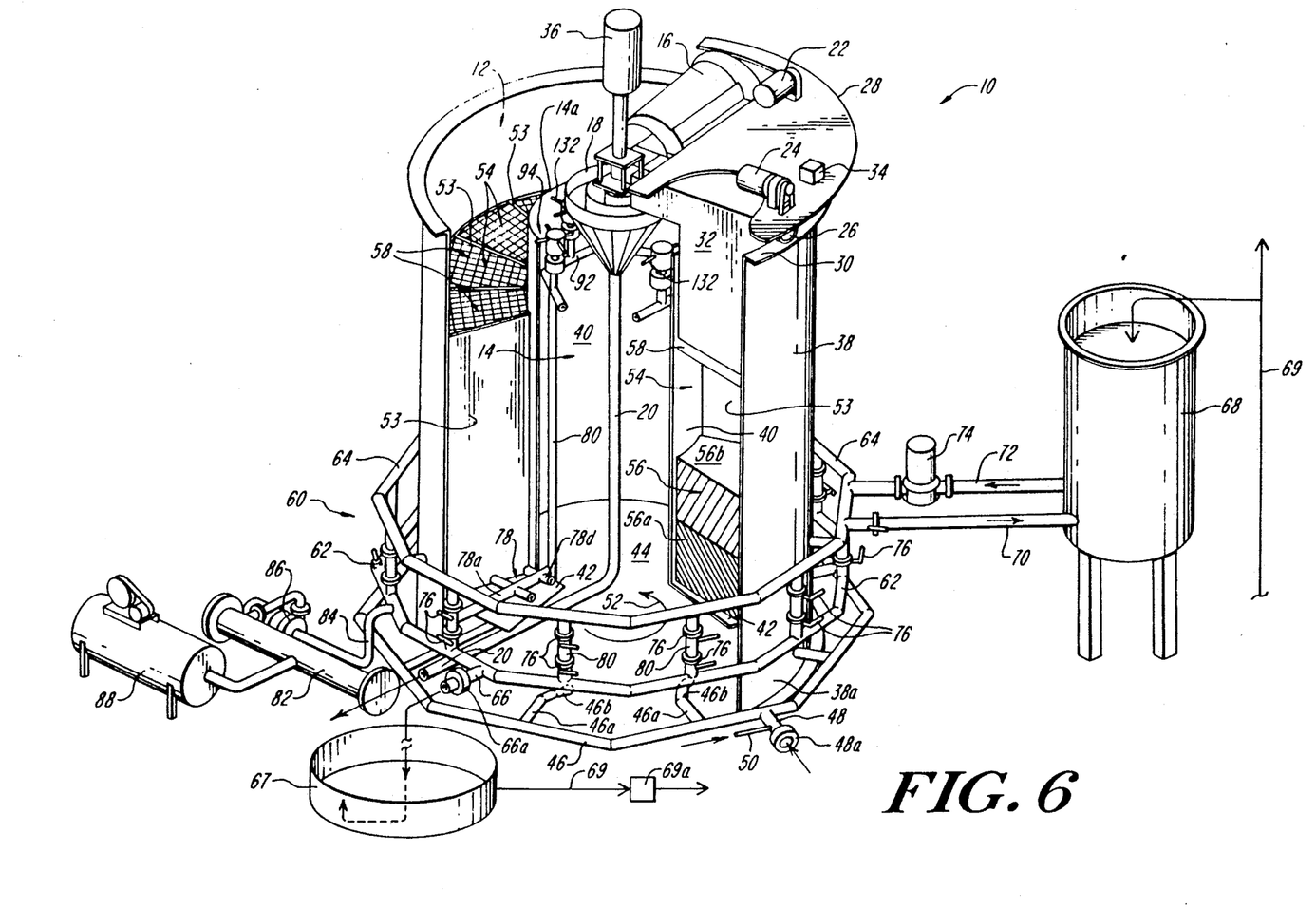
FIG. 6 is a view in perspective with portions broken away of a two stage clarifier of the type shown in FIGS. 1-3.
Figure 7:
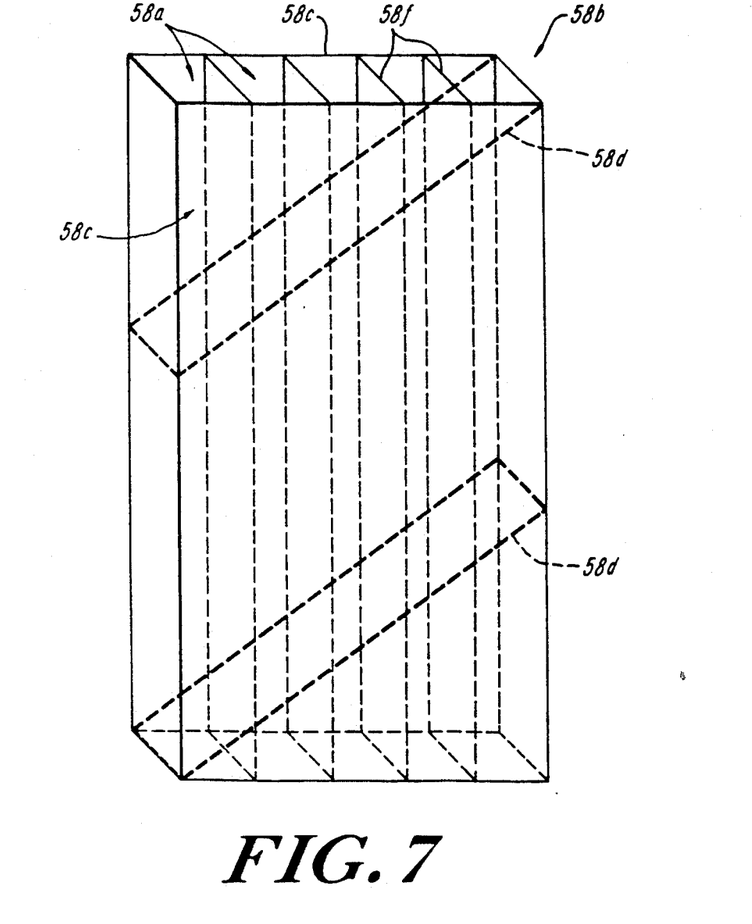
FIG. 7 is a view in perspective of a multi-channel extrusion that is cut on an angle to form one of the linear arrays of inclined baffle channels at the upper end of each flotation cell shown in FIG. 6.

The clarifier 116 is a two stage clarifier. It removes suspended particulates by DAF and by filtration, typically through a bed of sand or the like on the bottom of the flotation tank. FIGS. 6 and 7 show a type of two stage clarifier 116, designated "SAF-BP", preferred for use in the present invention. It is an improvement over the SASF type clarifier described in U.S. Pat. No. 4,626,345. It has an outer tank 12 that surrounds an inner tank 14 serving as a hydraulic flocculator. The outer tank is a flotation tank where rising air bubbles float flocculated particles to clarify the raw water. A multi-bladed scoop 16 rotates on the tank 12 to remove a floating layer of sludge that forms in the tank. The sludge is fed by the scoop to a collection cone 18 that in turn feeds a sludge outlet conduit 20 which feed conduit 148. A motor 22 rotates the scoop. A motor 24 drives a wheel 26 that propels a carriage 28 around the tank with the wheel riding on a flange 30 at the upper edge of the tank 12. The carriage 28 supports the scoop 16 and a backwash hood 32. A backwash hood actuator 34 raises and lowers the hood 32 in coordination with movement of the carriage around the tank. When a cell is to be backwashed, the hood lowers to cover the cell and direct the backwash water and contaminants to the flocculator tank 14. A rotating contactor 36 supplies electrical power to the motors and the actuator.

The flotation tank 12 is defined by an outer wall 38, an inner wall 40, and an annular bottom wall 42 that bridges the wall 38 and 40. The inner wall 40 is connected continuously to, and ends at, the bottom wall 42, while the outer wall continues downwardly over a lower portion 38a to a circular, generally flat bottom wall 44 of the clarifier, The bottom walls 42 and 44, the inner wall 40 and the outer wall lower portion 38a define the inner tank 14. This tank has an increased volume as compared to the hydraulic flocculator of the earlier SASF type clarifier. In the SASF clarifier the region below the bottom wall 42 was used as a clearwell to collect clarified water. This clearwell space is now not required and is therefore available to increase the capacity of the flocculator. By way of illustration but not limitation, for a five foot diameter clarifier, the holding capacity of the inner tank 14 of the present invention is about 1,936 liters (512 gallons) as compared to 530 liters (140 gallons) for a comparable SASF clarifier. At the same raw water feed rate, e.g. 140 l/min (32 gpm), this size of SAF-BP clarifier 116 exhibits a retention time of 13.8 minutes, versus 3.8 minutes for a comparable SASF unit. At a feed rate of 227 l/m (60 gpm) the retention rate provided by this size of SAF-BP clarifier 116, 8.5 minutes, is still more than double the retention time of the comparable SASF clarifier.

This increased flocculator volume also allows the use of a multiple-nozzle raw water distribution ring 46. The ring receives water to be treated from a main inlet 48. As shown in FIGS. 1-3, this inlet water is directed by gravity from the clarified water outlet of the clarifier 114, A flocculating agent such as alum is added to the raw water via a conduit 50. A valve 48a in the inlet line controls the inlet flow rate. A set of raw water injection nozzles 46a each connect to the ring, pass through the outer wall portion 38a, and terminate in angled, narrowing tip portions 46b. The nozzles are preferably equiangularly spaced and eight in number for a five foot diameter outer tank 12. The tips 46b are horizontal and angled in the same direction to set up a swirling flow 52 in the tank 14. This swirling enhances the mixing of the flocculating chemical and the raw water to facilitate the formation of flocs in the tank 14 before the raw water spills over the upper edge 14a into the flotation tank 12. As shown, the raw water distribution ring 46 preferably surrounds the outer wall 38 immediately above the clarifier bottom wall 44.

A set of radially oriented vertical divider walls 53 are secured in the flotation tank to divide all but the uppermost portion of the tank into a like number of cells 54, eleven as shown. The dividers are solid and extend vertically from the bottom wall 42 to a point near the inner tank upper edge 14a. This arrangement allows aerated, flocculated water to distribute itself uniformly in the upper portion of the tank 12, but with clarification by flotation in each cell otherwise being independent of the clarification process in other cells.

Each cell 54 is tall enough to accommodate a bed 56 of a filtration medium at its bottom, and to extend above the bed by at least a distance sufficient to accommodate an expansion of the bed during backwashing, typically twenty to thirty percent. By way of illustration, for a five foot diameter clarifier with a filtration bed with a depth of about 61 cm, the cells are about 132 cm 52 inches) high. This height also accommodates a set of baffles 58 each mounted at the upper end of each cell.

In the preferred form shown, the baffles 58 are formed by multiple channels 58a that are inclined from the vertical. Each channel blocks a direct upward movement of the filter media, while allowing a flow of backwash water to pass through to carry sludge and accumulated particulates from the filter medium to the flocculator tank 14 for reprocessing. The channels also slow the flotation process by forcing the rising flocs to traverse a longer path than a direct vertical rise, as described in the aforementioned U.S. Pat. No. 4,931,175. The smaller the angle of inclination (measured from the horizontal), the longer the path length. This effect is limited by space constraints and by the tendency of sludge to collect in the channels and impede the flotation process when then angle inclination (from the horizontal) is too small or the channels are too small. Dimensions and inclination will vary depending on the application and associated operating parameters.

Preferably the channels 58a are formed in linear array 58b extruded in plastic as a unit as shown in FIG. 7. Each linear array extends across a cell 54 in a direction transverse to the radial direction. An array may be cemented end-to-end to a like array or arrays in order to extend across the cell. Similarly, radially adjacent side walls of the arrays can be cemented to one another. Radially adjacent linear arrays 58b are alternated to slope in opposite directions. The slope of cut lines 58d,58d shown is reversed to form oppositely sloping arrays. In the preferred form interior dividing walls 58f are mutually spaced to produce channels each generally square in cross section and defining generally equal cross-sectional flow areas. By way of illustration, but not of limitation the channels can have cross-sectional dimensions of 1 inch with an angle of inclination from the horizontal of 60°. A typical vertical height of the baffles 58 is 6 to 8 inches. The baffles 58 extend fully across the cell.

The clarifier 116 preferably uses a dual media filter formed by a layer 56a of sand, or equivalent fine filter material, with an overlying layer 56b of a coarser material, preferably anthracite. In the preferred form, the sand has an average diameter of 0.35 mm and the anthracite has an average diameter of 0.8 to 1.0 mm. Each layer preferably has a depth of about 30 cm. When the baffle units 58 are used, and when this bed is expanded, or fluidized, during backwashing, even with a flow rate as high as 20 to 25 gpm/feet$^2$ and accompanied by a brief, violent agitation of the bed with a flow of compressed air, there is negligible media loss.

A dual ring/branched collection conduit system 60 collects clarified water, first filtrate water, and conducts backwash water to a selected cell or cells while maintaining isolation between the clarified water and the first filtrate water. A clarified water conduit 62 surrounds the outer tank 12 near its bottom wall 42. A first filtrate water conduit 64 also surrounds the outer tank 12, preferably parallel to the ring conduit 62 and closely spaced from it, as shown. Each ring 62,64 is a closed loop to provide a common flow path from and to all of the cells 54. Clarified water accumulated in the ring 62 flows to a main clarified water outlet 66 via a control valve 66a. As shown in FIG. 6, the clarified water empties into a tank 67 located below the clarifier to develop a large head loss. The tank 67 is preferably set at ten feet below the flotation tank. Alternatively, as shown in FIGS. 1-3, pump 167 in the clarified water outlet line produces a pressure drop equivalent to this vertical displacement. This head loss, and the use of pumps to develop pressure for backwashing, drive a comparatively high throughput rate for the clarifier 116. Valves 48a and 66a, operating in combination or with one set at a fixed rate and the other being variable, control the water level in the flotation tank 14 in response to a conventional water level sensor.

If first filtrate isolation from the clarified flow is used, turbid first filtrate water flows in the ring 64 to a first filtrate storage tank 68 external to the tank 12 via conduit 70. Conduit 72 with a pump 74 connected into the conduit draws water from the tank 68 to the ring 64 for use in backwashing. The volume of water diverted during a turbidity spike from a backwashed cell to the tank 68 is sufficient to supply enough water to backwash another cell 54. In addition, clarified water from tank 67 can be supplied via line 69 and pump 69a to the tank 68 to maintain its water level at a predetermined value sufficient for the backwashing.

Both rings 62 and 64 connect via a network of pneumatic, automatically operated valves 76 to a set of branched, slotted conduits 78 located at the bottom of each cell 54 in the sand layer 56a, adjacent the bottom wall 42. In the presently preferred form shown, each branched conduit 78 has a main conduit 78a and smaller diameter branch conduits 78b, 78c and 78d that extend horizontally and at right angles to the main conduit 78a toward and just short of, the divider walls 53 that define the cell. The conduits contain elongated slots 78e formed in their undersides to receive clarified water that has passed through the filter media, but rejecting the sand. The slots penetrate the conduit walls, and are typically 2-6 inches long and 0.2 to 1 mm wide depending on the size of the sand. Each main conduit 78a passes through the outer wall portion 38a and connects to a short T connector 80 to both rings 62 and 64. One of the valves 76 is secured in each branch of the T connector, on opposite sides of the conduit 78a, so that the opening of one of those pairs of valves 76 and the simultaneous closing of the other valve directs the flow of water from the branched conduit 78 to either ring 62 or 64, while blocking any significant cross flow between these rings.

In normal operation without any cell being backwashed, all of the "upper" valves 76 adjacent the ring 64 are closed, and all of the lower valves 76 are open so that collected clarified water in the branched conduits 78 flows to the ring 62 and then to the outlet 66. During backwashing of a cell, the upper valve 76 associated with that cell is opened and the associated lower valve 76 to the ring 62 is closed. The other upper valves 76 remain closed and the other lower valves 76 remain open. Concurrent activation of the pump 74 and hood actuator 34 produces a flow of water from the storage tank 68 to the cell to be backwashed. It is distributed by the branched conduit at the bottom of the bed 56, fluidizing the entire bed effectively. The backwash flow rate for a five foot diameter clarifier is preferably 20 to 25 gpm/ft$^2$. After backwashing is completed, the valves remain in the same condition. This directs the first filtrate water from the cell that has just been backwashed to the storage tank 68 while the collection of clarified water continues via ring 62 from the other cells. The dual rings, the network of automatic valves communicating to the branched conduits, and the organization of the flotation tank and the filter bed into cells that are to a larger extent operatively isolated, provides an isolation of the first filtrate from the clarified water. While this isolation is most important in systems for the treatment of drinking water, it can also be used in the treatment of waste water. Depending on what constitutes an acceptable level of pollutants in the final treated outflow, first filtrate isolation may be omitted in waste water treatment.

A portion of the clarified water is diverted to an air-dissolved tube (ADT) 82 via a conduit 84 and the pump 86 to pressurize the water. The air compressor 88 supplies compressed air to the ADT to dissolve it in the pressurized water. The components 82, 86 and 88 can be of the same type as the like components 136, 134, and 132 associated with the clarifier 114. A conduit 90 carries the pressurized water with dissolved air produced in the ADT into the clarifier 116. More precisely, the pressurized water is added to the flocculator tank 14 at its upper end using a distribution ring 92 that feeds a set of decompression valves 94. Positioning the valves near the top of the flocculator aerates the treated water directly and reduces the opportunity for the microscopic air bubbles in the treated water to coalesce. The valves 94 are preferably of the K-D type manufactured by the Krofta Engineering Corp. of Lenox, Mass.

Clarifiers 116 of the type just described not only handle larger flow rates than prior SASF clarifiers of comparable size, they also are more efficient. For raw water entering the clarifier 10 having 400 parts per million (ppm) TSS contaminants, the clarified water exiting the unit has been measured as having 11.2 ppm TSS contaminants.

With reference again to FIGS. 1-3, the presently preferred form of the present invention utilizes two of the stacks 112 with the entire operation enclosed in a building 160 of dimensions such that it can be readily monitored, e.g. from a central elevated office 162. To enclose stacks formed of clarifiers 114 having a 40 foot diameter (12.2 m) and clarifiers 116 having a 36 foot diameter (11.0 m), the enclosure can house both stacks and associated equipment and conduits in a building approximately 38 meters long by 18 meters wide by 9.5 meters high. Note that because of the tight packing of the clarifiers in stacks, it is possible to completely enclose all four clarifiers in a single, compact building that can be constructed at a reasonable cost. The compactness also reduces the cost of operation which includes regular physical inspections of the equipment and sampling of the water flows. The two stack plant shown in FIGS. 2 and 3 has a clarification capacity that would require about fourteen times more surface area if implemented using conventional sedimentation tanks. By enclosing all of the clarifiers, it is possible to control the emission of odors and noise and thereby greatly facilitate the siting of the plant and to reduce the aesthetic and environmental impact of the water treatment process. Note also that the stacks 112 are supported on a concrete floor 160a laid over ground, except for a laterally extending pit 164 and a cross pit 165, which hold the main raw waste water, clear water and sludge conduits. The pits include wells 164a, 164b and 164c at the raw water inlet, clear water outlet and the sludge collection pit 152.

The clarifier 114 is supported on steel (FIG. 1) or concrete (FIGS. 2 and 3) columns 166,166a. As shown in FIG. 1, the columns 166 support an array of steel beams 115 that underlie and support the bottom wall of the clarifier 114. In FIGS. 2 and 3 these supports 115a are reinforced concrete. This elevated support arrangement is possible only because the depth of the water held in the flotation tank 138 is very shallow. A rotating drum primary filter 172 of conventional design removes non-floating debris from the raw water before it flows to the clarifiers. Preferably coarse and fine screens are used with the coarse screens having an open vertical slot of about 25 mm. A fine screen preferably has opens of 3 to 6 mm with a screen cleaning and trash discharge capabilities. The screens can be either the drum or moving slot type. A hopper-type collection is advisable. It is significant that because dissolved air flotation techniques are used in the clarifiers, it is not necessary to have additional devices to provide for the separation of oil, grease and floating debris, as is commonly required with sedimentation type clarifiers. If a high level of sand is expected in the raw waste water, then it is preferable also to use a conventional cyclone type sand separator installed in the feedline of the primary clarifier. Conventional cyclone separators have an automatic sand collector which discharges into a hopper. With the overall waste water contains low or moderate quantities of sand, the clarifier 114 can deal with the settled particulates through its bottom scraper and sump. The sump may have an automatic discharge and large units can also include a screw type sand extractor built into the bottom of the sump, as is known with commercially available SPC-type clarifiers.

It should also be noted that the stack arrangement of the clarifiers, the below ground level location of the clear water discharge pipes in the pits 164 and 165, and pumps 167 in the clarified water discharge lines produces sufficient head loss to drive the dual media filtration in the clarifier 116 at a high flow rate.

Figure 4:
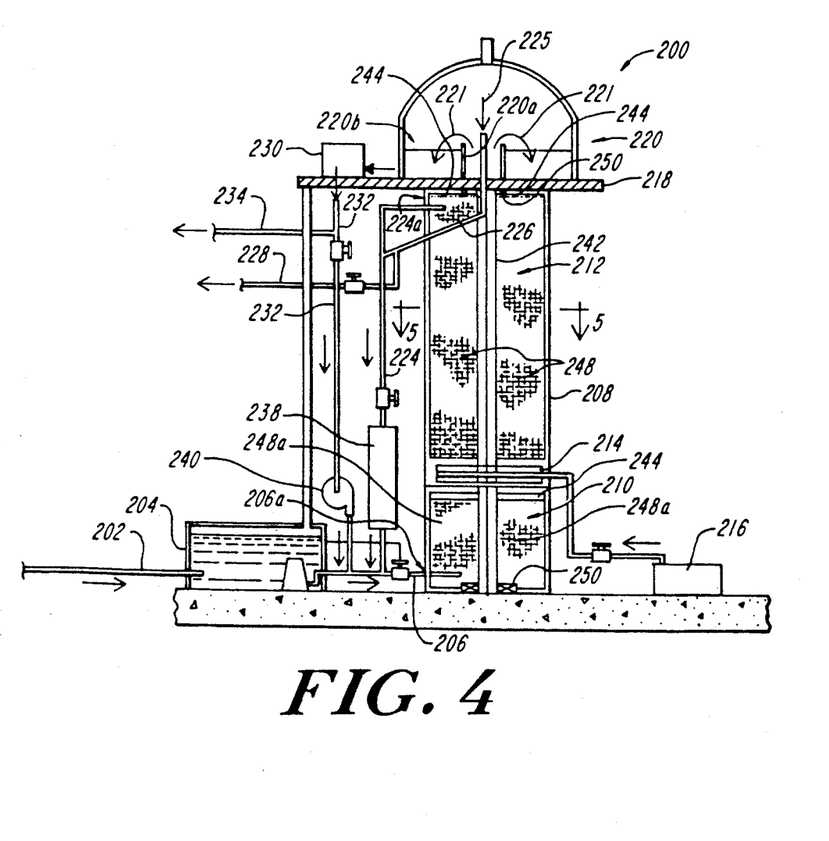
FIG. 4 is a simplified view in vertical section of a bioreactor according to the present invention adapted for use in conjunction with the clarifier treatment facility shown in FIGS. 1-3.
Figure 5:
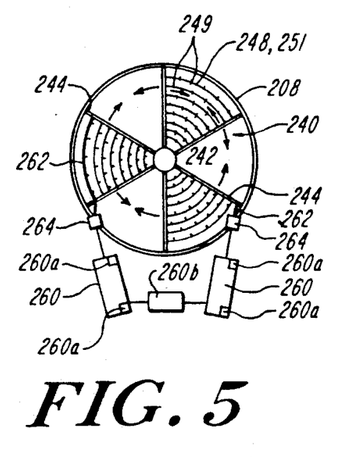
FIG. 5 is a view in horizontal section taken along the line 5—5 in FIG. 4.

FIGS. 4 and 5 illustrate a bioreactor 200 adapted for use in conjunction with the clarifiers 114 and 116. More specifically, the clarified water flowing from the single stage clarifier 114 flows through a line 202 from the clarified water outlet of the clarifier 114, a sump 204 and an inlet line 206 to a generally cylindrical stainless steel reactor tank 208. An anoxic zone 210 in the lower portion of the tank 208 receives the inflow at its lower portion via an inlet 206a. Preferably the zone 210 extends generally over the lower third of the tank. An aerobic zone 212 that extends over generally the upper two-thirds of the tank. Between the zones a set of porous tubes 214 release compressed air produced by a blower 216 into the treated water (bioliquor) flowing upwardly through the interior of the reactor tank. Platform 218 extends above the upper surface of the tank and supports a small, dedicated DAF clarifier 220, preferably of the Supracell type.

Inlet water first flows upwardly through the anoxic zone 210. It then flows upwardly on air bubbles from the aerator 214 to the aerobic zone 212. The bioliquor exits the tank 208 by flowing upwardly through the platform 218 to the clarifier 220 where it flows over a central cylindrical wall 220a into a flotation tank 220b as suggested by flow arrows 221. A portion of the bioliquor flow from the aerobic zone is directed via a recycling outlet 224a and conduit 224 back to the inlet conduit 206. Floated sludge from the clarifier 220 is directed as indicated by arrow 225 via a discharge conduit 226 to the conduit 224. A branch conduit 228 provides a valved outlet for excess sludge.

Clarified and biotreated water outlet from the dedicated clarifier 220 is directed from an external level control 230 via conduit 232 to a clarified and biotreated water outlet 234 which feeds the two stage clarifier 116. The conduit 232 continues from the branch to feed the clarified and biotreated water to the inlet conduit 206 to the bioreactor tank 208. The flow of sludge and bioliquor recirculating through the conduit 224 is driven by a peristaltic pump 238 which maintains the recirculation at a flow rate that is typically of about two and preferably to about five times the total flow rate into the reactor tank from the line 206. The peristaltic pump is used since it is less likely to destroy the bacteria floc carried in the recirculation flow. A conventional centrifugal pump 240 is located in the clarified and biotreated water recycle line 232 to maintain a recirculation flow that ranges from approximately 40% to 100% of the total flow of the clarified and biotreated water.

Figure 5A:
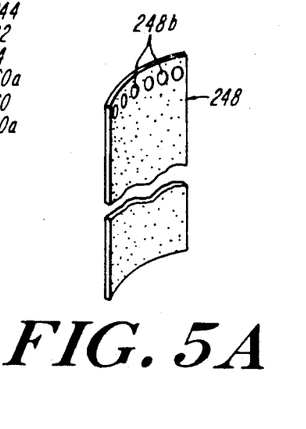
FIG. 5A is a view in perspective of one strip of the biocarrier shown in FIG. 5.

A principal feature of the present invention is that the bacteria used in the bioreactor are supported on or bound to a biocarrier that hangs vertically through each of the zones 210 and 212. In the presently preferred form, the biocarrier comprises strips 248,248a of a woven textile, and particularly a deep pile woven textile such as used carpeting hung from a frame 240. The frame includes a central tubular member 242 that extends vertically along the central axis of the tank 208. In a preferred form it has a diameter of five to six inches. The member 242 supports two vertically spaced sets of arms 244, preferably tubular rods with a two inch diameter that each extend generally radially from the tube 242 to divide the interior of each of the zones 210,212 into six sectors that each span approximately 60° cf arc. One set of radial arms is located at the top of each zone 210 and 212. Alternate sections contain the carpet carriers 248,248a. The strips 248 in the zone 212 are longer than the strips 248a in the zone 210, reflecting the differences in the vertical height of these zones. The carpet strips each preferably contain openings or a series of reinforced eyelets 248b which engage hooks 249 carried on a mutually spaced set of curved stainless steel plates 251 mounted to extend between adjacent radial arms 244. The plates preferably have a generally circumferential curvature and extend vertically for about two inches. This simple "hang on" mounting system allows the convenient installation and replacement of a biocarrier. It avoids the cost and loading problems of small, floating cubes of foam. The weight of the strips of wet, suspended carpet 248,248a hold them vertically within the bioliquor.

Figure 5B:
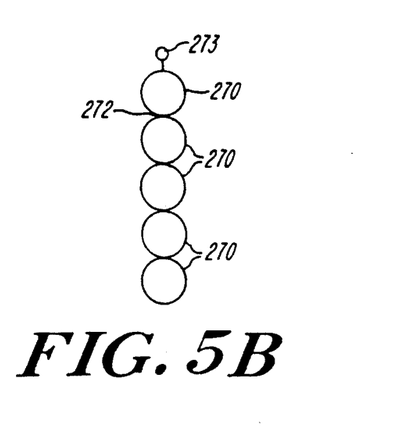
FIG. 5B is a view in perspective of an alternate biocarrier for use in the bioreactor of FIG. 4.

Another hanging biocarrier that can be used is formed by a securing a set series of standard plastic components 270 used in commercial trickling filters (where raw water is trickled through a tank holding a mass cf these components each supporting bacteria). A string or line of these components are supported on a rod 272 with an eyelet 273 or other standard hanging implement at its upper end. Each eyelet 273 is releasably secured on one of the hooks 249. Multiple such strings hanging on one plate 251 together form a portion of a biocarrier that resembles a curved, beaded curtain.

The frame 240 is mounted in fluid tight rotary bearings 250 secured in the upper and lower end walls of the reactor tank. They allow a oscillatory motion of the frame, and the carpet strips 248,248a hung on frame, driven by any suitable conventional mechanical arrangement for producing a reciprocating motion. A presently preferred arrangement is shown in FIG. 7. It uses a pair of linear electric motors 260,260 that opeate in tandem to rotate the frame 240 in an oscillatory manner via wires 262 each connected to one of the arms 244. Seals 264 allow a linear movement of the wires while holding the bioliquor in the tank. Preferably each motor 260 has limit switches 260a connected through a delay circuit 260b to create a slight pause at the end of each swing of the frame.

The carpet strips 248 carry a standard aerobic bacteria in the aerobic zone 212. The strips 248a carry standard anaerobic bacteria in the anoxic zone 210. The bacteria are of the type used in activated sludge plants to digest dissolved organic contaminants, transforming this organic dissolved material through biological action into $CO_2$ and water. Because of the large amount of dissolved organics which can be digested by the bacteria, they experience substantial growth in their biomass. The oscillatory motion of the carpet biocarriers ensures a good interaction between the bioliquor and the bacteria. It also sloughs off excess biomass from the biocarrier. The excess then is carried away by the bioliquor into 1) the clarifier 220 where it is formed into a floating sludge and released or recycled or 2) into the recirculation line 224.

In operation, the size of the clarifiers and the flow rates into the clarifiers depends on the size of the population served by the waste water treatment system. For example, for approximately twenty thousand people, a maximum daily flow during rainy weather is approximately 9.5 m$^3$/min., the required flotation surface is approximately 34.3 m$^2$/train 112 and the SAF-BP unit can have a diameter of 22 feet (6.7 m). For a population of sixty thousand, the rainy weather maximum daily flow increases to 28.7 m$^3$/min., the required flotation surface area is 102.5 m$^2$/train and the clarifiers 114 and 116 are 40 feet (12.2 m) diameter and 36 feet (11.0 m) diameter units, respectively. For a population of two hundred thousand, the maximum daily flow in rainy weather increases to 95.6 m$^3$/min., the required flotation surface area is 341.1 m$^2$/train, the clarifier 114 as a 70 feet (21.3 m) diameter, and the clarifier 116 has a 62 feet (18.9 m) diameter. The parallel train configuration provides redundancy. Normally both trains would operate only on rainy days. Therefore one train is sized to be able to clarify a maximum flow during a dry day. FIGS. 1-3 show the middle range given above, namely two parallel trains of SPC 40 clarifiers mounted over SAF36-BP clarifiers. As noted above this configuration requires a building size of roughly 18×36×9.5 meters height. On a rainy day the sixty thousand population unit system this sixty thousand unit population system is able to process 10.9 million U.S. gallons per day (GPD). The twenty thousand population unit configuration processes 3.6 million GPD and the two hundred thousand population unit system processes 36.2 million GPD. In addition to sizing the treatment plant and the constituent clarifiers for table I below demonstrates typical clarification levels that can be achieved using the waste water treatment system of the present invention.

TABLE I

|  | ss ppm | B.O.D. ppm | NH$_4$ ppm | TKN ppm | P$_{tot}$ ppm |
|---|---|---|---|---|---|
| Incoming Raw Water | 300 | 350 | 20 | 35 | 6.5–2.5 |
| Effluent Phase C.1 | 5 | 90 | 15 | 30 | 3.0–1.5 |
| Effluent Phase C.2 | 5 | 30 | 10 | 20 | 3.0–0.3 |
| Effluent Phase C.3 | 5 | 10 | 1 | 5 | 2.0–0.2 |

Phase C.1 involves the physical-chemical clarification of the clarifiers 114 and 116. It includes phosphorous removal, particularly in the filtration stage of the clarifier 116, but does not include biological treatment such as provided by a flow of the Supracell clarifier 114 to the bioreactor 200. Phase C.2 demonstrates the further clarification that is obtainable when a biological treatment of the bioreactor 200 is added in series between the clarifiers 114 and 116. In particular, while the clarifiers 114 and 116, acting without the bioreactor are each able to reduce the BOD by about 50%, for a total removal of about 75%, the bioreactor is able to reduce the BOD to 30 ppm, less than 10% of the BOD concentration in the raw incoming water. Phase C.3 adds the denitrification of the anoxic zone 210 combined with the recirculation of the bioliquor and sludge via line 224. Note that while the addition of this the anoxic stage has a dramatic effect in reducing the nitrogen content of the bioliquor. Ammonia and TKN (total organic nitrogen) are reduced by almost a factor of 10. The use of the anoxic zone also further reduces the BOD levels from a final value of 30 ppm to 10 ppm for the numbers given in this illustration. Suspended solids (SS) are effectively eliminated by phase C.1 processing alone.

Tables 2-5 which follow demonstrate several test operations of the clarification efficiency of the invention at level C.1 operating with a Supracell clarifier as the initial clarifier 114 and an SASF clarifier acting as the two stage clarifier 116, but with no biological treatment.

TABLE 2

Ferric Sulfate into SASF
Net System flow = 170 LPM (liter/min.) (45 GPM),
SPC = 5 ppm cationic polymer,
SASF = 98 ppm ferric sulfate, 0.5 ppm cationic polymer, Ozone dosed into SPC effluent ("eff.") = 2.8 mg/l

|  | NTU | TSS, mg/l | COD, mg/l | BOD, mg/l |
|---|---|---|---|---|
| RAW | — | 140 | 360 | 172 |
| SPC eff. | 31 | 37 | 198 | 83 |
| SASF eff. | 1.1 | N.D. (Not Detectable) | 95 | 44 |

TABLE 3

Ferric Sulfate into SPC
Net system flow = 114 liters per minute LPM (30 GPM)
SPC = 75 ppm ferric sulfate, 4.4 ppm cationic polymer
SASF = 3.3 ppm cationic polymer
Ozone dosed into SPC eff. = 4.2 mg/l

|  | NTU (turbidity) | TSS, mg/l | COD, mg/l | BOD, mg/l |
|---|---|---|---|---|
| RAW | — | 307 | 477 | 204 |
| SPC eff. | — | 38 | 142 | 100 |
| SASF eff. | — | N.D. | 89 | 33 |

TABLE 4

Change in conditions only as follows:
Net system flow = 151 LPM (40 GPM),
SPC = 75 ppm ferric sulfate, (No Ozone)

|  | NTU | TSS, mg/l | COD, mg/l | BOD, mg/l |
|---|---|---|---|---|
| RAW | 68 | 223 | 499 | 252 |
| SPC eff. | 28 | 55 | 165 | 83 |
| SASF eff. | 1.3 | N.D. | 99 | 44 |

TABLE 5

Test with PAC (7157) as the main coagulant.
PAC applied into SPC
Net system flow = 114 LPM (30 GPM),
SPC = 100 ppm PAC, 1.5 ppm anionic polymer,
SASF = 78 ppm ferric sulfate, 1.0 ppm cationic polymer. No ozone dosed.

|  | NTU | TSS, mg/l | COD, mg/l | BOD, mg/l |
|---|---|---|---|---|
| RAW | — | 668 | 770 | 368 |
| SPC eff. | 61 | 179 | 349 | 154 |
| SASF eff. | 1.3 | N.D. | 84 | 37 |

|  | Total P, mg/l | TKN, mg/l | NO$_3$—N, mg/l | NH$_3$—N, mg/l |
|---|---|---|---|---|
| RAW | 7.3 | 31 | 1.7 | 20 |
| SPC eff. | 4.7 | 30 | 1.1 | 19 |
| SASF eff. | 0.04 | 16 | 0.1 | 18 |

These tables demonstrate, among other things, the capability of the clarifier trains utilizing a one stage and then two stage clarifier to control COD, BOD, phosphorous and nitrogen to a degree that either meets, or almost meets, U.S. Government standards without biological treatment or any other special reactors. This demonstrates that a compact, and therefore easily maintained treatment plant of the type shown in FIGS. 1-3 can be constructed to provide a substantial water treatment capabilities without the additional cost of biological treatment. This allows, for example, municipalities to readily deal with population increases. This clarification system can be used either as the principal treatment, or it can substantially reduce chemical and biological contaminants so that existing conventional treatment systems can handle increased demands.

The substantial physical-chemical clarification of Phase C.1 processing is also cost effective in terms of the cost of flocculating chemicals used in normal operation. Depending on the particular type or mix of chemicals, e.g. ferric sulfate, PAC, anionic polymer, rationic polymer, etc., total chemicals costs, per person, per year in current U.S. dollars range from $2.92 to $7.30.

There has been described a municipal waste water treatment facility which is highly compact and as a result readily allows the complete enclosure of the treatment system to reduce noise and odor pollution as well as to allow a convenient and efficient monitoring of its operation. The system has a comparatively low installation cost and low operational cost as compared to comparable conventional sedimentation units. The invention provides dramatic reductions in TSS and significant reductions in COD, BOD, nitrogen and phosphorous contaminations without the use of biological treatment. By using the bioreactor of the present invention, it is possible to readily and reliably meet all U.S. Government standards for all of these pollutants.

The invention readily accommodates wide variations in flow rates, such as occurring between dry and rainy days and during seasonal population changes. Further, the present invention provides a biological treatment capability which with relatively low space requirements and with very substantial savings in biocarrier costs as compared to conventional techniques. In addition, the present invention provides a plant which produces a comparatively dry sludge as an output, a typical value being 2%-6% dry solid content, which makes the sludge amenable to transportation for disposal or further processing such as an oxygenation or ozonation process such as described in U.S. Pat. Nos. 5,013,429 and 5,145,582. These patents describe a treatment tank with an inbuilt mixer which provides a vigorous mixing of oxygen and/or ozone with a relatively thick sludge to render the sludge biologically safe. Further processing reduces the dry solid content to 20% to 40%, about equivalent to an apple.

While the invention has been described with respect to its preferred embodiments, it can be readily understood that various modifications and alterations will occur to those skilled in the art from the foregoing detailed description and the accompanying drawings. For example, while the invention has been described with respect to a stack or train of clarifiers which can feed their intermediate clarified water to a particular form of biotreatment, it will be understood that conventional biotreatment can be used at between the two clarifiers. It is also possible to use the bioreactor with only an aerobic zone. Further, while the invention has been described in its preferred form with respect to a plant involving two trains of two clarifiers each, it will be understood that the arrangement of the present invention can be extended to three or more such stacks operating in parallel. Thus an additional train 112 of clarifiers can be provided in a triangular or linear array with the two clarifiers shown. Still further, while the invention has been described with respect to certain types of dissolved air flotation clarifiers, other types of DAF clarifiers are known and can be used. For example, the SAF-BP two stage clarifier could be replaced by an SAF-type clarifier, however, it would be much larger, more costly, and require a larger head loss than the SASF or SAF-BP clarifiers, and therefore would detract from some of the advantages of the present invention such as its comparatively and low capital cost. In addition, as noted above, the SAF and SASF units have operational deficiencies as compared to the SAF-BP units. These and other variations and modifications are intended to fall within the scope of the appended claims.

What is claimed is:

1. A system for treating raw inlet water to remove dissolved and colloidal solid contaminants, including organic solids that require treatment with oxygen, to produce a clarified effluent water, comprising a first clarifier having a shallow tank that receives said raw inlet water and means for conducting dissolved air flotation clarification in said tank to produce a first clarified output water, a second clarifier having a hydraulic flocculator that receives said first clarified output water and feeds it to a clarification tank that has (i) means for conducting dissolved air flotation clarification in said tank, (ii) a filtration medium at the bottom of the tank divided into radial zones, (iii) means for backwashing said medium at a preselected zone, and (iv) means for withdrawing the clarified, filtered effluent water from said clarification tank, and means for mounting said first clarifier above said second clarifier in a stacked relationship.

2. The water treatment system of claim 1 further comprising a second pair of said first and second clarifiers and mounting means in side-by-side array with said first and second clarifiers and said mounting means for said clarifiers.

3. The water treatment system of claim 1 further comprising means for enclosing said first and second clarifiers to control odor and noise.

4. The water treatment system of claim 1 wherein said second clarifier includes vertical walls that divide the tank into mutually isolated radial zones, and inclined baffle means in each zone over said filtration medium.

5. The water treatment system of claim 4 wherein said second clarifier includes means for isolating the first filtrate from the clarified water produced in said clarification tank.

6. The water treatment system of claim 1 comprising a bioreactor connected in fluid communication between said first clarifier and said second clarifier.

7. The water treatment system of claim 6 wherein said bioreactor comprises a reactor tank having an aerobic zone, a waste water inlet to said reactor tank at its bottom end, a bioreacted water outlet at its upper end, and a recirculation outlet from said aerobic zone at its upper end, a biocarrier supported within said reactor for an oscillatory movement within the reactor, a dedicated dissolved air flotation clarifier that receives said bioreacted water from said bioreactor outlet to produce a clarified, biotreated water and a floated sludge, means for recirculating at least a portion of said floated sludge from said dedicated clarifier and said biotreated water from said recirculation outlet to the raw water inlet, means for recirculating a portion of the clarified, biotreated water from the dedicated clarifier to the waste water inlet, and means for aerating the raw water in said aerobic zone.

8. The water treatment system of claim 7 wherein said biocarrier comprises sheets of a woven textile.

9. The water treatment system of claim 8 wherein said biocarrier comprises carpeting.

10. The water treatment system of claim 7 wherein said reactor tank includes an anoxic zone located between said raw water inlet and said aeration means, and wherein said bio-carrier means oscillates in said anoxic zone and supports the bio-organisms.

11. A bioreactor using bio-organisms that react with contaminants, that can include BOD's and COD's, dissolved or suspended in waste water to neutralize the contaminants, comprising a reactor tank having an aerobic zone, a waste water inlet, a reacted water outlet, and a recirculation outlet from said aerobic zone, biocarrier means supported within said reactor in said aerobic zone for an oscillatory movement within in the reactor, said bio-carrier supporting the bio-organisms, a dissolved air flotation clarifier that receives bio-treated water from said bioreactor outlet to produce a clarified, bio-treated water and a floated sludge, means for recirculating at least a portion of said floated sludge from said clarifier and the biotreated water from the recirculation outlet to the waste water inlet, means for recirculating at least a portion of said clarified, bio-treated water from the clarifier to the water inlet, and means for aerating the water in said aerobic zone.

12. The bioreactor of claim 11 wherein said biocarrier comprises sheets of a woven textile.

13. The bioreactor of claim 12 wherein said biocarrier comprises carpeting.

14. The bioreactor of claim 11 wherein said reactor includes an anoxic zone with said tank located below said aerating means, said anoxic zone having said waste water inlet at its lower end and wherein said biocarrier means oscillates in said anoxic zone and supports the bioorganisms.

15. The bioreactor of claim 11 wherein said sludge and biotreated water recirculation means includes a peristaltic pump.

* * * * *